Figure 1:
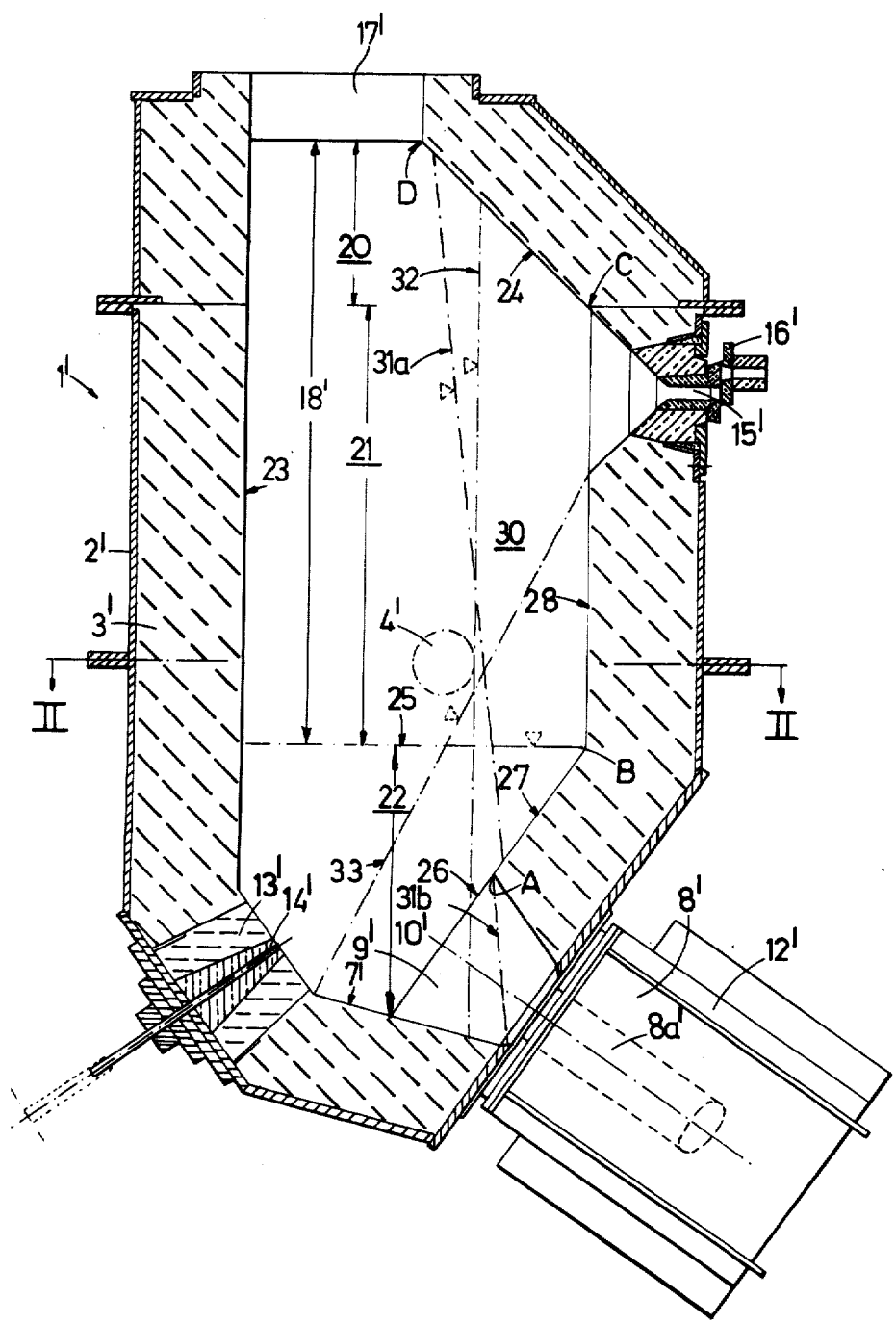

United States Patent [19]
Norberg

[11] 3,934,863

[45] Jan. 27, 1976

[54] APPARATUS FOR REFINING MOLTEN METAL AND MOLTEN METAL REFINING PROCESS

[75] Inventor: Lars-Gunnar Norberg, Hagfors, Sweden

[73] Assignee: Uddeholms Aktiebolag, Hagfors, Sweden

[22] Filed: Mar. 11, 1974

[21] Appl. No.: 450,232

[52] U.S. Cl. .................................... 266/35; 13/29
[51] Int. Cl.[2] .......................................... C21C 5/46
[58] Field of Search ............ 13/2, 29, 30; 75/60, 63, 75/51, 52; 266/35, 36 P, 36 H, 41

[56] References Cited
UNITED STATES PATENTS

| | | | |
|---|---|---|---|
| 1,031,257 | 7/1912 | Greene | 13/29 |
| 1,769,223 | 7/1930 | Isliker | 75/63 X |
| 1,958,581 | 5/1934 | Kennicott | 266/35 |

FOREIGN PATENTS OR APPLICATIONS

| | | | |
|---|---|---|---|
| 22,777 | 10/1896 | United Kingdom | 266/35 |
| 5,172 | 11/1902 | Denmark | 266/35 |

*Primary Examiner*—Gerald A. Dost
*Attorney, Agent, or Firm*—Cushman, Darby & Cushman

[57] ABSTRACT

Apparatus suitable for injecting fluids, particularly suspensions of solids in gases, below the surface of a molten metal, e.g. in emulsion metallurgy, comprises a converter having a tuyere for injecting the fluid below the surface of the molten metal, and a heating zone, spaced away from the converter but in liquid communication with the converter at a level below the surface of the molten metal, the heating zone having a thinner lining than the converter and being heated by electric induction heating so that a temperature gradient can be set up between the heating zone and the converter to maintain the temperature of the molten metal in the converter. The converter is dimensioned such that it can be tilted to a position where it can still contain the whole volume of molten metal to be treated but the openings of the channel and of the tuyere are exposed above the surface of the molten metal in the tilted position. The apparatus can be used for desulphurisation or decarburization of steel, the reduction of reducible metal oxides by emulsion reduction, the introduction of alloying components or the introduction of endothermally reacting gases into molten metals.

11 Claims, 2 Drawing Figures

APPARATUS FOR REFINING MOLTEN METAL AND MOLTEN METAL REFINING PROCESS

The present invention relates to apparatus for treating molten metals with gas/solid suspensions or other fluids, particularly introducing suspensions of solid powders dispersed in gases, into the molten metal and processes of treating molten metals using the apparatus.

Numerous metallurgical processes exist which involve the injection into the molten metal of one or two phases which are disperesed in a fluid matrix phase. One area in which such processes are particularly important is so-called emulsion metallurgy. Processes in this area take advantage of the intensive contact between metal, slag and gas which can be obtained in fully dispersed systems and are particularly useful for iron and steel making- and refining processes. Such processes in which suspensions of powders in fluid phases are introduced below the surface of the molten metal thus give greater reaction surfaces compared with processes in which the reactant to be introduced is placed on top of the melt.

One of the major problems in operating such metallurgical processes is the maintenance of the temperature of the molten metal as the introduction of the suspension causes considerable temperature reduction in the molten metal. The same problem may also often arise when introducing endothermically reacting gases into the metal. Of course, it is possible to use conventional heating means to heat the whole bulk of the metal being treated, e.g. blowing with oxygen to oxidise a component of the melt, but introduction of oxygen is not always desired and in practice, electrical heating means are preferred. Conventional arc furnaces do not use electrical energy efficiently. Electrical induction heating makes much more efficient use of electrical energy than electric arc furnaces but induction heating of the whole contents of a converter would require capital expenditure of a size that would be difficult to justify on an industrial scale, having regard to the energy available from electricity and present day electrical energy costs. The comparatively high electrical efficiency of induction heated vessels requires a thin lining of the vessel. A thin lining in a reaction vessel is, however, for practical reasons, not desirable due to the risk of damage caused by the wear on the lining during use. However, if the thickness of the lining is increased, the high electrical efficiency will be lost.

We have now found that it is possible to take advantage of the benefits of electric induction heating without having to meet the problems of surrounding the whole converter with induction heating coils, by modifying the design of a conventional converter suitable for introducing gas/powder suspensions or other fluid materials below the surface of the molten metal.

The present invention provides apparatus for treating a molten metal with a gas/solid suspension or other fluid comprising a refractory lined, tiltable converter for holding the molten metal, said vessel having a wall and a bottom; means for introducing the metal to be treated and means for removing the metal after treatment; at least one tuyere for introducing the gas/solid suspension or other fluid into the converter, said tuyere extending through the bottom or wall of the vessel at a level that will be below the surface of the molten metal when the converter is in its vertical operating position; the refractory lining of the converter being of sufficient thickness to resist wear during operation; said converter having a freeboard space of height which will be at least equal to the depth of the molten metal during operation, to allow for splashing and foaming during operation; said converter having at least one heating zone spaced away from the converter; the heating zone having at least one channel in liquid communication with the converter, the channel opening into the converter at a level that will be below the surface of the molten metal when the converter is in its vertical operating position; said heating zone having a refractory lining which is thinner than the refractory lining of the converter, and having means for heating the contents of the zone by electric induction heating to an extent such that a temperature gradient can be established between the contents of the zone and the contents of the converter, the converter being dimensioned such that it can be tilted to a position where it can still contain the whole volume of molten metal to be treated, but the openings of the channel and of the tuyere are exposed above the surface of the molten metal in the tilted position.

The exact dimensions of the heating zone are not critical, but it is necessary that a relatively small fraction of the total molten metal in the apparatus be located in the heating zone so that it can be induction heated to a temperature sufficiently above that of the main bulk of the molten metal to provide a sufficient temperature gradient to maintain or raise the bulk of the molten metal at, or to, the desired temperature. To obtain maximum benefit from this temperature gradient, it is desirable to position the tuyere so that the flow of the gas/solid suspension or other fluid injected through the tuyere will meet the heat flow from the heating zone in the region outside the opening of said channel or channels.

We have found it convenient to utilize a heating zone which is part of a loop formed by a channel between two openings in the converter wall or bottom, the molten metal in the converter inter-connecting the two channel openings. Preferably the channel openings penetrate the converter wall or bottom at the same level. It is also possible to operate with more than one loop or to use a simple extension of the main converter having a single liquid communication to the main converter. Whatever the exact physical form of the heating zone, it is advantageous to have the heating zone completely encircled by the induction heated windings.

For reasons associated with the need to minimize the erosion of the lining of the converter, the converter may have an inclined bottom, that is to say, inclined at an angle to the sides, but also vessels having a flat bottom perpendicular to the sides may be used.

The mouth of the tuyere, or tuyeres, is located in the region of the flow of hotter metal from the heating zone. This arrangement reduces the risk of freezing of the molten metal in the region of the tuyere.

Preferably the tuyere, or tuyeres, are positioned so that the fluid introduced through the tuyere does not enter the heating zone. This arrangement reduces the risk of damage on the thin lining of the heating zone. Most conveniently, the tuyere is directed so that any solid particles entrained in a carrier fluid and injected through the tuyere will sweep over the region outside the channel opening or channel openings without entering the heating zone.

The reaction vessel is preferably tiltable in a manner such that the molten metal can be removed from the vessel without removing molten metal from the heating zone.

The converter may otherwise be constructed in accordance with conventional design and be dimensioned conventionally. This means that the converter has a sufficient lining thickness to resist the severe wear during operation. Further the converter has a sufficient freeboard above the surface of the molten metal to allow splashing and foaming of slag and metal during operation. The freeboard height herein preferably is at least equal with the depth of the molten metal during operation.

As will be described in more detail below, the appropriate dimensioning of the converter can be brought about by having the middle section of that part of the converter wall containing the heating zone substantially vertical during normal operation and the upper and lower parts of that wall inclined at an angle to the middle section so that the three sections together form a bowl which can receive the molten metal when the converter is tilted. By appropriate dimensioning of these three sections of wall with respect to each other and the converter bottom, it is possible to tilt the converter to another position where it can still contain the whole volume of the molten metal to be treated and to have the opening of the tuyere exposed above the surface of the molten metal in this tilted position, but the openings of the channel being still below the surface of the molten metal. In this position, it is possible temporarily to stop introducing the fluid through the tuyere into the molten metal, e.g. while sampling is carried out, while still maintaining the temperature of the molten metal by induction heating.

Figure 2:
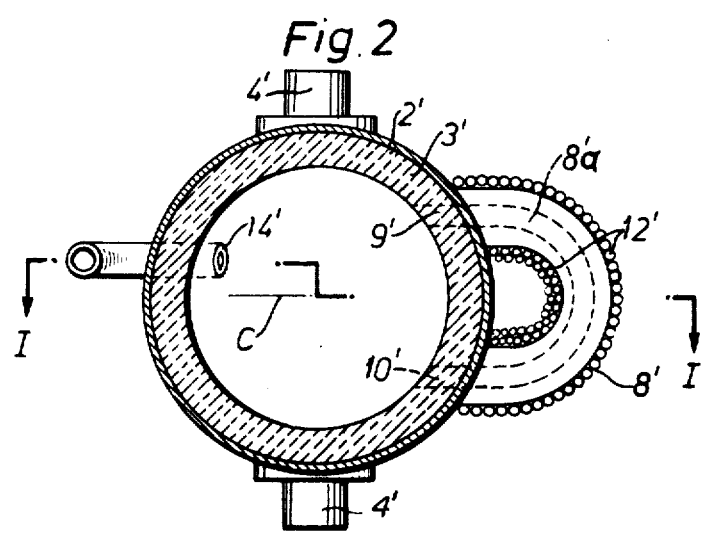

In the accompanying drawings,

FIG. 1 shows a vertical section through a converter constructed in accordance with the invention and illustrates, schematically the principle construction of the converter, and FIG. 2 shows a horizontal section II—II through the same converter.

The apparatus comprises a tiltable converter 1' having a steel casing 2' and refractory lining 3'. Axle bars 4' are mounted in bearings (not shown) so that the converter can be tilted about the axis running through axle bar 4'. A melting loop 8' is provided in the side wall immediately above its junction with sloping bottom 7'. Loop 8' comprises a channel 8a' extending between two openings 9' and 10' into the main body of the converter through the front wall. The whole of melting loop 8' is encircled by induction windings 12' for heating the contents of the loop. The detail of induction windings 12' are as shown in FIG. 2. Converter 1' is also provided with tuyere 14' situated adjacent to sloping bottom 7', a tap hole 15' having a sliding gate 16' for tap hole 15' and a charging port 17'. That part of the converter wall containing tap hole 15' is regarded as the front wall of the converter and the opposite wall is regarded as the back wall. Back wall 23 is substantially vertical when the converter is in its normal vertical operating position and tuyere 14' is located in a sloping extension 13' joining back wall 23 to sloping bottom 7'. The front wall has a central section 28 which is parallel to back wall 23, an upper sloping section 24 and a lower sloping section 27 joining middle section 28 to sloping bottom 7'.

Converter 1' consists of 3 main parts, a top cone 20, a cylindrical body 21 and a lower zone 22 acting as a reservoir for the molten metal to be treated. Top cone 20 has the form of an oblique frustrum of a cone. Charging port 17' forms the circular mouth of zone 20 and the base of cone 20 is defined by the interface between zone 20 and cylindrical body 21. One side of cone 20 is formed from backface 23 while the other wall of cone 20 is formed from front wall 24 which slopes in accordance with conventional converter design.

The total volume of cylindrical body 21 and top cone 20 is sufficient to receive the volume of foam which could be formed when the molten metal contained in lower zone 22 is treated in certain metallurgical reactions, for example, the reaction occurring when a powder ore suspension is injected into an iron melt having a high carbon content and is emulsified in the melt. Tap hole 15' is located in front wall 28 immediately below to where it joins inclined wall 24.

Lower zone 22 is designed to contain the whole volume of molten metal to be treated. Line 25 indicates the anticipated upper surface of the molten metal when the converter is filled immediately prior to use. The functional form of bottom zone 22 arises from cutting the front of the bottom portion straight off so that an inclined flat front wall 26 is provided, this front wall 26 projecting from the lower portion of wall 28 down to the lowest point in the converter. The openings 9' and 10' of heating channel 8a' open into the body of the converter at the lowest part of flat front wall 26. Heating channel 8a' is arranged perpendicularly to front wall 26 and the axis of symmetry is directed at a point on the opposite wall, back wall 23. The portion of inclined front wall 26 which is above openings 9' and 10' of heating channel 8a', that is to say the wall between openings 9' and 10' and the vertical front wall 28 of the converter, is designated wall portion 27. Wall portion 27 together with front wall 28 and front wall 24 of the top cone form a basin 30, which should contain a volume at least corresponding to the lower zone 22. This volume is defined within the points indicated A, B, C and D and the converter is designed in this way so that basin 30 can contain all of the molten metal which is contained in bottom zone 22 by tilting the converter about axle 4' to a position such that the surface of the molten metal is indicated by the lines 31a and 31b. In this position, openings 9' and 10' of the channel 8a' will be exposed above the surface 31a and 31b which is of great value if a local failure should occur in the thin lining of heating channel 8a'.

When the converter is to be tapped, the converter is tilted still further about the axis running through axle bars 4' so that the surface of the molten metal will take up a position indicated by line 32. In this position, the molten metal can be removed through tapping hole 15' without emptying heating channel 8a' during the tapping operation but it is possible to empty heating channel 8a' if desired by emptying the converter through port 17' by tilting the converter still further about the axis running through axle bar 4'. During longer breaks in treatment, e.g. during sampling and analysing of a sample, the converter may be tilted to a position such that the surface of the molten metal will take up a line indicated by line 33. In this position, tuyere 14' and tap hole 15' are exposed above the metal surface. The feeding of fluid through tuyere 14' can thus be interrupted during this pause in the reaction and freezing at tap hole 15' avoided. The temperature of the molten metal while the converter is tilted at this position can be maintained by the temperature gradient from heating channel 8a' and a sufficient supply of electric power can be fed to induction windings 12' for this purpose.

Tuyere 14' is directed at a point above openings 9' and 10' in front wall 26. It is advantageous to direct tuyere 14' at a point approximately in the region of the junction between front wall 28 and front wall 26. With this arrangement, the fluid injected through tuyere 14' will sweep through the bottom zone 22 in a direction approximately perpendicular to the axis of symmetry of the heating channel 8a'. This brings about an efficient interaction between the heat flow from heating channel 8a' and the cooler flow from tuyere 14'. It is also desirable that tuyere 14' be located unsymmetrically relative to the plane of symmetry of the converter and this is illustrated clearly in FIG. 2 which shows the cross-sectional view along II—II through the converter. FIG. 2 illustrates the detail of the heating zone 8' which comprises channel 8a' having openings 9' and 10', a water cooled thin lining 8b' and induction coils 12' encircling zone 8'.

This improved converter has the advantage not only of the valuable interaction between tuyere 14' and heating channel 8a' but also in the following respects. A larger freeboard 20 and 21 is provided to contain foaming slag. This reduces the risk of spillage or overflow. If a local break should occur in the lining 8b' of heating channel 8a' the main portion of the molten metal can be transferred to basin 30 by tilting the converter so that the only metal lost is that contained in heating loop 8a' itself. It is then possible to take appropriate action without the need first to empty the converter completely. The use of the improved embodiment also enables the total relative height of the converter to be reduced while the depth of molten metal during tapping can be increased. It is also advantageous to be able to tilt the furnace to the position where the surface of the molten metal is indicated by line 33 so that the metal can be kept hot in the converter during breaks in the reaction, the flow through the tuyere can be temporarily stopped and the reaction can be continued e.g. once a sample has been analysed, simply by tilting the furnace back to its normal vertical working position.

In operation, converter 1' is charged with an adequate quantity of metal to be treated. Normally, the heating loop 8' is kept filled with metal which is maintained in a molten state by passing electricity through induction heating coils 12'. The metal to be treated can either be charged in the molten state into the converter vessel through the charging port 17', or in the solid state through the charging port 17' and melted in the vessel starting from a starting melt in the melting loop 8'. It can also be introduced in the form of an oxide which is reduced in the converter. The heating during operation of the converter is normally arranged so that a temperature of the molten metal in heating channel 8a' is about 50° to 200°C higher than that of the main body of metal in converter 1'. When the desired temperature conditions have been achieved in the converter, the powder/gas suspension (or other gas liquid or other fluid to be brought in contact with the molten metal in the converter), is introduced into the molten metal through tuyere 14'. Introduction of the powder dispensed in the carrier gas brings about considerable cooling of the molten metal in a region of the tuyere mouth but these heat losses are compensated for by the flow of hot metal from the heating loop 8'. By adjusting the input of electric power to the induction heating unit, i.e., to the induction windings 12', the temperature of the molten metal in the heating channel 8a' is maintained at about 50° to 200°C higher than that of the metal in the converter outside the openings 9' and 10' of the channel 8a'. By this means, an effective heat transport from the channel to the bulk of molten metal in the converter is achieved. Tuyere 14' is located on that side of the converter 1' which is opposite that side of the converter where the heating channel 8a' is located. Tuyere 14' is directed towards a point in the converter wall 6' above the openings 9' and 10' to the channel 8a'. By this arrangement, the hot metal in the region outside openings 9' and 10' will effectively be replaced by colder metal from other parts of the bulk of molten metal in the converter 1' and possibly to a certain degree also by fluid injected through tuyere 14', which improves the heat exchange between channel 8a' and the bulk of molten metal in the converter 1'. Moreover, the hot metal from the heating channel 8a' is distributed rapidly throughout the body of molten metal in the converter which is important for the kinetics of the metal treatment processes. A further advantage of the interaction between the hot metal from heating channel 8a' and the suspension or other fluid injected through tuyere 14' is that the metal from heating channel 8a' prevents the tuyere mouth from freezing while the cooling effect brought about by the injected suspension or other fluid protects the furnace lining 3' adjacent to openings 9' and 10' of channel 8a' so that the lining in this region is not eroded too quickly.

A typical sequence of operation of the apparatus is the following. The molten metal to be treated is charged into converter 1' through the port 17' such that at least half the height of the converter is left as freeboard 18'. The temperature of the molten metal is measured, and if necessary for the treatment in hand, raised by adjusting the supply of electric power to the induction windings 12'. When the desired temperature has been reached in the molten metal, the selected fluid is injected through tuyere 14'. If the fluid is a suspension of powder in a gas, the suspension is first prepared in a powder dispenser and fed through a conduit to tuyere 14'. According to the embodiment shown in FIGS. 1 and 2, tuyere 14' is directed at a point above the channel 8a'. This, in combination with an adequate injection velocity enables a quick replacement of metal outside the channel 8a' in accordance with the principles of the invention without any powder or other agents from tuyere 14' entering the channel. Freezing of tuyere 14' is avoided by the flow of heat from the heating zone in the channel 8a'. The temperature in the molten metal is controlled and if necessary adjusted by adjusting the input of electric energy to the induction windings 12'. When the treatment of the metal is finished, the injection of the fluid is stopped and after adjusting the chemical composition if necessary the converter is tilted so that metal can be removed through tap hole 15'. During this operation an inert gas or possibly air, nitrogen or other fluids may preferably be injected through tuyere 14' which during the tapping is exposed above the surface of the molten metal. Before tapping, the slag usually is removed through port 17', and blowing through tuyere 14' facilitates slag removal in a manner above described. Usually molten metal is retained in the channel $8a'$ and in the bottom of the converter so that the openings $9'$ and $10'$ of the channel are interconnected to form a closed loop $8'$.

Although the apparatus described above has a single melting loop, it is possible to provide the converter with more than one loop of the type illustrated in FIGS. 1 and 2. Moreover, it is not essential that the induction heating zone be in the form of a loop with two channel endings at the converter wall. It can be a single induction heating zone having a single opening at the converter wall. It is also possible to provide more than one tuyere in the wall or bottom of the converter in combination with one or more heating channels which conveniently are arranged opposite the tuyere, wherein at least one tuyere is directed towards a region above each of the channels terminating in the converter wall or bottom.

The apparatus can be used for carrying out various treatments of molten metal with a fluid which is injected beneath beneath the surface of the molten metal. Particularly, however, the apparatus is designed for use in emulsion metallurgy techniques for carrying out various metallurgical reactions known per se or for introducing different alloying components into the molten metal. For example, the apparatus may be used for the desulpshurization of steel using a suspension of CaO or $CaC_2$— powders entrained in a carrier gas. Another important field of the application is emulsion decarburization of molten iron or steel, in which a suspension of iron ore concentrate in a carrier gas is injected into the molten iron or steel. Other agents which may be injected into the molten metal in the form of powdered solids dispersed in a carrier gas, are various slags used for dephosphorization or for the transformation of hard (i.e., undeformable in hot forming conditions) undesired inclusions in the metal to soft tolerance inclusions. The apparatus also can be used for direct production of iron or other metals or alloys by emulsion reduction. In this procedure carbon and an appropriate metal oxide powder are injected through the tuyere by the carrier gas. Another application of the apparatus of the invention is in alloying of metals with cetain elements which may be difficult to introduce into the metal in high yield by conventional techniques and also still further application is the injection of endothermally reacting gases, such as steam (water vapour).

I claim:

1. Apparatus for treating a molten metal with a gas/solid suspension or other fluid comprising a refractory lined converter for holding the molten metal, the converter being tiltable about a horizontal axle bar and having:
   (1) A front-wall, a back wall and a sloping bottom defining a lower converting zone, the front wall and back wall being on opposite sides of a plane containing the axle bar which is a vertical plane when the converter is in its vertical operating position, the bottom being inclined at an oblique angle to the front wall so that the lower zone tapers towards the point which is the deepest point in the converter when the converter is in its vertical operating position,
   (2) A top section, on top of the walls, including a charging port and having a sloping top wall inclined at an oblique angle to the front wall so that the top section tapers towards the charging port,
   (3) At least one heating zone spaced away from the converter, the heating zone having at least one channel in liquid communication with the lower zone, the channel opening into the lower zone at a level that will be below the surface of the molten metal when the converter is in its vertical operating position and essentially in the region of that point in the converter which is the deepest point when the converter is in its vertical operating position and means for heating the contents of the zone by electric induction heating to an extent such that a temperature gradient can be established between the contents of the heating zone and the contents of the lower converting zone,
   (4) At least one tuyere for introducing the gas/solid suspension or other fluid, said tuyere opening into the lower converting zone through the bottom or the back wall at a level that will be below the surface of the molten metal when the converter is in its vertical operating position, said tuyere and said heating zone channel being located on the opposite sides of the plane containing the axle bar which is a vertical plane when the converter is in its vertical operating position,
   (5) A tap-hole in the front wall,
   the converter being dimensioned such that when the converter is in a substantially horizontal tapping position, the volume of the basin bounded by the sloping top wall, the front wall and the sloping bottom is at least equal to the volume of the lower converting zone.

2. Apparatus according to claim 1, wherein the tuyere, is positioned such that the suspension or other fluid introduced through the tuyere does not enter the heating zone.

3. Apparatus according to claim 2, wherein the tuyere and the heating channel are located in the converter wall on opposite sides of the plane containing the axle bar which is a vertical plane when the converter is in its vertical operating position.

4. Apparatus according to claim 1, wherein the tuyere is directed such that any solid particles entrained in a carrier fluid injected through the tuyere will sweep through a region outside the channel openings without entering the heating zone.

5. Apparatus according to claim 1, wherein the converter is tiltable so that molten metal can be removed from the converter without removing molten metal from the heating zone.

6. Apparatus according to claim 1 wherein the tap hole is provided in the converter front wall above the anticipated slag line, and at a position that will be at the deepest part of the converter when it is in a substantially horizontal tapping position and the heating channel is located between the tap hole and the tuyere.

7. Apparatus according to claim 1, wherein the channel is part of a loop.

8. Apparatus according to claim 7, wherein the openings in the channel into the lower converting zone are at the same level.

9. Apparatus according to claim 1, wherein the heating zone of the channel is completely encircled by induction heating windings.

10. Apparatus according to claim 1, wherein the converter is dimensioned such that it can be tilted to a position where it can still contain the whole volume of molten metal to be treated but the opening of the tuyere is exposed above the surface of the molten metal in the tilted position, while the openings of the channel are below the surface of the molten metal in the tilted position.

11. Apparatus according to claim 1, wherein the converter is dimensioned such that it can be tilted to a position where it can still contain the whole volume of metal to be treated but the openings of the heating zone channel and the tuyere are exposed above the surface of the molten metal in the tilted position.

* * * * *